United States Patent [19]
Adrian et al.

[11] Patent Number: 5,579,876
[45] Date of Patent: Dec. 3, 1996

[54] STOPPER FOR A HYDRAULIC DASHPOT

[75] Inventors: Adolf Adrian; Rolf Angermann, both of Ennepetal, Germany

[73] Assignee: August Bilstein GmbH & Co. KG, Ennepetal, Germany

[21] Appl. No.: 519,482

[22] Filed: Aug. 25, 1995

[30] Foreign Application Priority Data

Oct. 15, 1994 [DE] Germany .......................... 44 36 967.0

[51] Int. Cl.$^6$ .............................. F16F 9/36; B60G 13/08
[52] U.S. Cl. .................... 188/322.17; 92/165 R
[58] Field of Search ..................... 188/322.17, 322.16, 188/322.18, 316, 317, 318; 92/165 R, 168; 277/188 R, 152, 59

[56] References Cited

U.S. PATENT DOCUMENTS

| | | | |
|---|---|---|---|
| Re. 33,715 | 10/1991 | Miura | 188/322.17 |
| 2,498,802 | 2/1950 | Funkhouser | 188/322.17 |
| 3,185,262 | 5/1965 | Axthammer | 188/322.17 |
| 3,837,445 | 9/1974 | Pierle | 188/322.17 |
| 3,863,740 | 2/1975 | Kinman | 188/322.17 |
| 4,342,447 | 8/1982 | Marx | 188/322.17 |
| 4,364,457 | 12/1982 | Wössner et al. | 188/322.17 |
| 4,438,834 | 3/1984 | Handke et al. | 188/322.17 |
| 4,480,730 | 11/1984 | Koller et al. | 188/322.17 |
| 5,441,132 | 8/1995 | Pradel et al. | 188/322.17 |

FOREIGN PATENT DOCUMENTS

| | | | |
|---|---|---|---|
| 0609018 | 11/1960 | Canada | 188/322.17 |
| 0535409 | 4/1993 | European Pat. Off. | 188/322.17 |
| 3125691 | 2/1982 | Germany | 188/322.17 |
| 4207053 | 9/1993 | Germany | 188/322.17 |
| 605382 | 5/1960 | Italy | 188/322.17 |
| 60-159433 | 8/1985 | Japan | 188/322.17 |
| 60-179539 | 9/1985 | Japan | 188/322.17 |
| 642567 | 2/1994 | Japan | 188/322.17 |
| 1142107 | 2/1969 | United Kingdom | 188/322.17 |

*Primary Examiner*—Douglas C. Butler
*Attorney, Agent, or Firm*—Max Fogiel

[57] ABSTRACT

A stopper for a hydraulic dashpot for a motor vehicle. The dashpot essentially comprises a piston and cylinder. The cylinder is occupied by fluid and is divided into two chambers by a piston. The piston is mounted on the end of a rod that travels into and out of the cylinder. The stopper is mounted at the end of the cylinder the piston rod travels in and out of. The stopper accommodates seals and several annular components, and at least one of the annular components is attached to the wall of the cylinder. The stopper has an annular component in the shape of a cup at the piston-rod entry-and-exit end. The base of the cup-shaped annular component extends radially inward and has a circular hole at the center. The piston rod extends through the hole. The side of the cup-shaped annular component extends toward the interior of the cylinder. The cup-shaped annular component also accommodates an annular piston-rod aligning component that is at least partly surrounded by the cup-shaped annular component. The annular rod-aligning component has an axially concentric circular cutout for the piston rod to travel in and out through.

8 Claims, 2 Drawing Sheets

5,579,876

STOPPER FOR A HYDRAULIC DASHPOT

BACKGROUND OF THE INVENTION

The present invention concerns a stopper for a hydraulic dashpot for a motor vehicle. The dashpot essentially comprises a piston and cylinder. The cylinder is occupied by fluid and is divided into two chambers by a piston. The piston is mounted on the end of a rod that travels into and out of the cylinder. The stopper is mounted at the end of the cylinder the piston rod travels in and out of. The stopper accommodates seals and several annular components, and at least one of the annular components is attached to the wall of the cylinder.

The piston rod travels in and out through an aperture in the stopper. There is a seal between the piston rod and the aperture. The stopper also seals the interior of the cylinder off from the atmosphere. It must also be capable of accommodating any transverse forces on the piston rod without wearing out prematurely, especially when employed in a shock absorber.

A two-cylinder hydraulic dashpot is known from German OS 4 0 788. It has a stopper over the end that the piston rod travels through. The stopper comprises a cylindrical component and a support and spacer assembled from sheet-metal components. The cylindrical component keeps the piston rod aligned. The support and spacer supports the cylindrical rod-aligning component against both the inner and the outer cylinder, keeps them separated, and seals them off. The support and spacer comprises a ring and, at the top, a disk. The ring constitutes a bearing for the rod-aligning component and includes a channel for releasing the dragging oil. It has several bearing sites. The disk accommodates an oil seal. Although this known stopper is an improvement over those that accommodate solid and heavy dashpot-aligning mechanisms, the oil seal can lift off the piston rod when the rod moves too far laterally, and the fluid can leak out. The stopper is not rigid enough subject to stress for use with single-cylinder dashpots that need to be highly stable.

German 4 207 099 C1 discloses a hydraulic dashpot for motor vehicles. The dashpot has a stopper comprising a cylindrical piston-rod aligning component, an oil seal, and a support and spacer assembled from sheet-metal components. The stopper can be prefabricated. The drawback to this embodiment is that the piston rod is aligned by one sheet-metal component whereas the main seal is accommodated in another. Sine the main seal is also axially remote from the rod-aligning component to a certain extent, powerful transverse forces can in this case as well increase friction or loosen the seal from the rod.

SUMMARY OF THE INVENTION

The object of the present invention is accordingly a dashpot stopper that will be simple to manufacture, that will reliably accommodate any transverse forces acting on the piston rod, that will be as compact as possible, wherein the seal between the stopper and the rod will be as near the piston-rod aligning component as possible, and wherein the seal between the stopper and the wall of the cylinder will be as simple as possible.

The stopper accordingly has an annular component in the shape of a cup at the piston-rod entry-and-exit end. The base of the cup-shaped annular component extends radially inward and has a circular hole at the center. The piston rod extends through the hole. The side of the cup-shaped annular component extends toward the interior of the cylinder. The cup-shaped annular component also accommodates an annular piston-rod aligning component that is at least partly surrounded by the cup-shaped annular component. The annular rod-aligning component has an axially concentric circular cutout for the piston rod to travel in and out through. The rod-aligning component also includes accommodations for seals. The seals seal the piston rod off from the rod-aligning component and are secured by the base of the cup-shaped annular component. There is another seal between the annular piston-rod aligning component and the wall of the cylinder. This seal is secured axially by the face of the wall of the cup-shaped annular component and by an annular shoulder on the outside of the aligning component.

An embodiment of this type, with a rod-aligning component that is very compact and has accommodations for the seals, allows the use of a particularly simple and easy to manufacture cup-shaped annular component at the piston-rod entry-and-exit end, The cup-shaped annular component can be attached to the rod-aligning component. The cup-shaped annular component maintains a secure hold in the cylinder as well as precise and prescribable security for the seals, both between the rod-aligning component and the piston rod and between the rod-aligning component and the wall of the cylinder.

The rod-aligning component is preferably both force fit and form fit to the cup-shaped annular component. Such a connection can be cemented, welded, or threaded. The result will be a prefabricated compact stopper assembly with its seals all integrated into it.

The rod-aligning component can in particular be form fit to the cup-shaped annular component by means of a bead and groove. The bead will be radially inwardly elevated and extend around the inner surface of the cup-shaped annular component, engaging a matching groove extending around the outer surface of the rod-aligning component. The bead and groove are both concentric with the axis of the cup-shaped annular component.

This approach facilitates prefabrication as well as manufacture in that permanent attachment involving the seals as well can be achieved just by circumferential rolling or compression in a die while the dashpot is being made.

The cup-shaped annular component in another advantageous embodiment is force fit and/or form fit to the wall of the cylinder. As in the conventional approaches to attaching cup-shaped annular components to rod-aligning components, welding, cementing, threading, and retaining rings are absolutely acceptable means of obtaining simple and easy attachments.

Further advantages can be attained, especially in the event of automated manufacture, if the cup-shaped annular component is form fit to the cylinder by a bead and a groove. The axially concentric bead in this embodiment is pinched up axially out of the outer edge of the base of the cup-shaped annular component. The matching axially concentric groove is pinched up axially out of the piston-rod entry-and-exit end of the cylinder and accommodates the bead.

A pressure-application process of this type can be employed to mass produce large quantities of prefabricated dashpot stoppers with permanently integrated seals and rod-aligning components.

The same is true of a stopper whereby the cup-shaped annular component is form fit to the wall of the cylinder by a flange and a bead. The flange is axially concentric and faces radially inward around the piston-rod entry-and-exit end of the cylinder. The bead is radially pinched in out of the inner surface of the cylinder below the rod-aligning component, which it forces toward the interior of the cylinder.

This embodiment constitutes a prefabricated and fully integrated stopper that can be secured in a prefabricated cylinder by means of circumferential beads and flanges.

One particular advantage of all these embodiments is that the rod-aligning component can be plastic. Plastic is usually not appropriate for such parts because it is not strong enough for the conditions that occur in normal operation. It is only the design in accordance with the present invention with its reliable form fit and stable seal accommodation that provides a very simple and dependable dashpot.

BRIEF DESCRIPTION OF THE DRAWINGS

Various embodiments of the present invention will now be specified with reference to the accompanying drawing, wherein.

DESCRIPTION OF THE PREFERRED EMBODIMENTS

Figure 1:
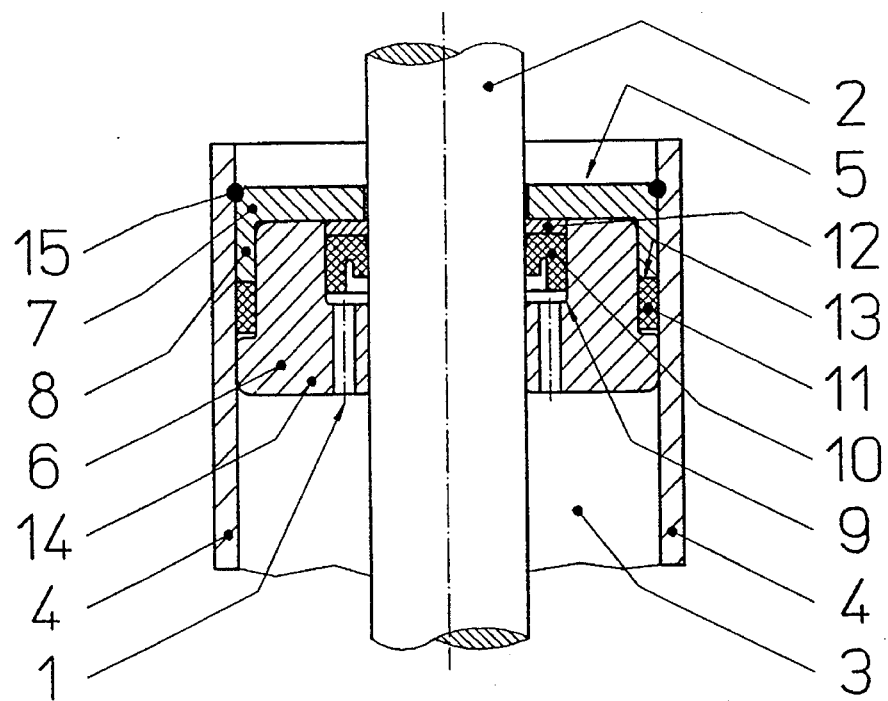
FIG. 1 is a section illustrating a dashpot stopper with a cup-shaped annular component form fit to the wall of the cylinder by a retaining ring.

The dashpot stopper 1 illustrated in section in FIG. 1 fits into a cylinder 3 and against the cylinder's wall 4. A piston rod 2 travels into and out of cylinder 3 through stopper 1.

Stopper 1 comprises a cup-shaped annular component 5 that encloses part of an annular piston-rod aligning component 6.

The cup-shaped annular component comprises a base 7 and a wall 8. The base has an axially concentric circular cutout for piston rod 2 to travel in and out through. Wall 8 extends axially toward the chambers inside cylinder 3 and encloses rod-aligning component 6.

Rod-aligning component 6 has an axially concentric bore for piston rod 2 to travel in and out through and accommodations 9 for seals 10. The seals seal the piston rod 2 off from the rod-aligning component 6 and the inside of cylinder 3 from the atmosphere. There is another seal 11 between the rod-aligning component 6 and the wall 4 of cylinder 3.

Seals 10 are secured in the accommodations 9 in rod-aligning component 6 and by the base 7 of cup-shaped annular component 5, along with an annular spacer 12 in the present embodiment. The seal 11 on the outer surface is secured axially by the face 13 of the wall 8 of cup-shaped annular component 5 and by an annular shoulder 14 on the outside of rod-aligning component 6.

Cup-shaped annular component 5 is secured to the wall 4 of cylinder 3 by a retaining ring 15.

A dashpot stopper of this compact embodiment can be prefabricated with all its seals and aligning components already in place and installed in cylinder 3 in a production line.

Figure 2:
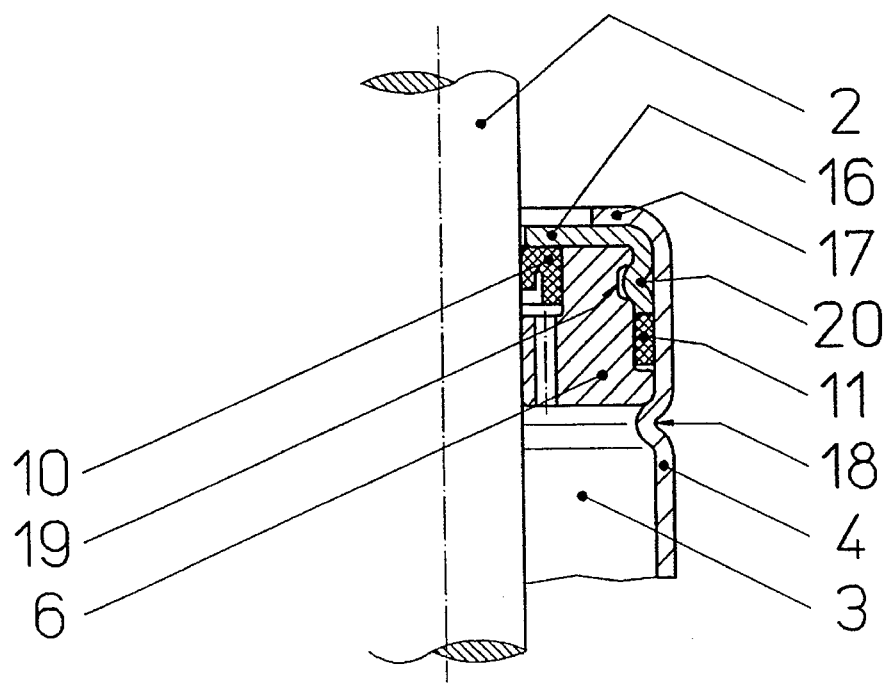
FIG. 2 is a section illustrating a dashpot-stopper assembly prefabricated by simple flanging and beading and installed in the dashpot on an industrial scale.

FIG. 2 is a section through another embodiment of the dashpot as recited in claim 6. The cup-shaped annular component 16 in this embodiment is form fit to the wall 4 of cylinder 3 by a flange 17 and a bead 18. Flange 17 is axially concentric and faces radially inward around the piston-rod entry-and-exit end of cylinder 3. The bead is radially pinched in out of the inner surface of cylinder 3 below rod-aligning component 6, which it forces toward the interior of the cylinder.

Rod-aligning component 6 is simultaneously attached to cup-shaped annular component 16 by a bead 20 around the inner surface of the cup-shaped annular component. The bead is pinched in axially concentric out of the wall 8 of the cup-shaped annular component and fits into a matching axially concentric groove 19 in the outer surface of rod-aligning component 6.

Seals 10 and 11 are conventionally secured.

Figure 3:
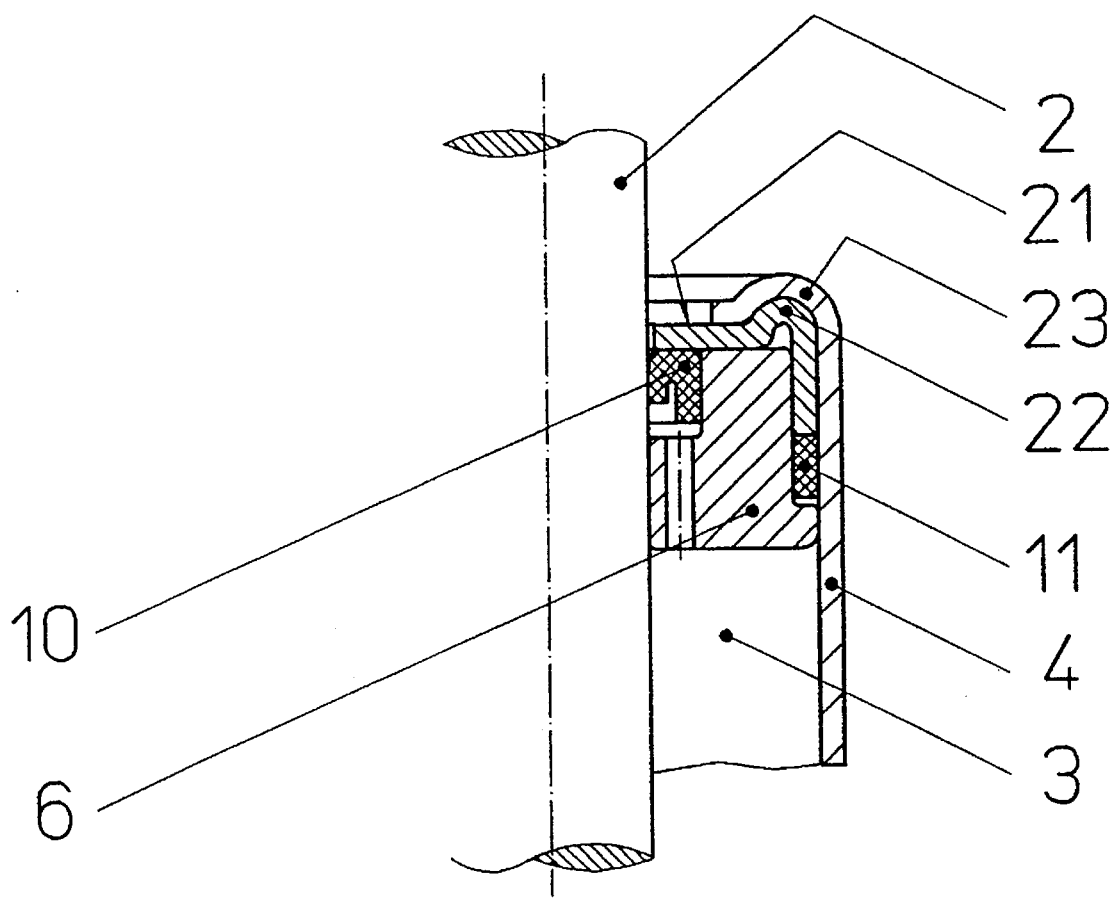
FIG. 3 is a section illustrating a dashpot stopper with a snap-together attachment in the form of an axially elevated bead around the edge.

FIG. 3 illustrates another embodiment wherein cup-shaped annular component 21 is form fit to cylinder 3 by an axial bead 22 pinched up out of the outer edge of the piston-rod entry-and-exit end of the cup-shaped annular component and a matching axially concentric groove accommodating the bead.

A cup-shaped annular component 21 is form fit to cylinder 3 by a bead 22 and a groove 23. Axially concentric bead 22 is pinched up axially out of the outer edge of the base of the cup-shaped annular component. The matching axially concentric groove 23 is pinched up axially out of the piston-rod entry-and-exit end of cylinder 3 and accommodates the bead.

We claim:

1. A stopper in a hydraulic dashpot for a motor vehicle, comprising: a piston and cylinder with an interior, said cylinder holding fluid and being divided into two chambers by said piston, a piston rod mounting said piston at one end and traveling into and out of said cylinder, said stopper being mounted at an end of said cylinder where said piston rod travels in and out; seals and a plurality of annular components in said stopper, at least one of said annular components being attached to a wall of said cylinder; said stopper having another one of said annular components in shape of a cup at an entry-and-exit end of said piston rod; said cup-shaped annular component having a base extending radially inward and having a circular hole at a center of said cup-shaped annular component, said piston rod extending through said hole, said cup-shaped annular component having a side extending toward said interior of said cylinder; an annular piston-rod aligning component in said cup-shaped annular component and being at least partly surrounded by said cup-shaped annular component; said annular rod-aligning component having an axially concentric circular cutout for said piston rod to travel in and out through and also including accommodations for said seals, said seals sealing said piston rod off from said rod-aligning component and being secured by said base of said cup-shaped annular component; one of said seals being between said annular piston-rod aligning component and the wall of said cylinder, said one of said seals being secured axially by a face of the wall of said cup-shaped annular component and by an annular shoulder on an outside surface of said aligning component, said seals being encapsulated and positioned in a preliminary stage of assembly, transverse forces acting on said piston rod being resisted, another one of said seals being between said stopper and said piston rod and being substantially close to said piston-rod aligning component.

2. A stopper as defined in claim 1, wherein said rod-aligning component is attached to the cup-shaped annular component by both force-fit and form-fit.

3. A stopper as defined in claim 2, wherein said rod-aligning component is form-fitted to the cup-shaped annular component by a bead and groove.

4. A stopper as defined in claim 1, wherein said cup-shaped annular component is force-fitted and form-fitted to a wall of said cylinder.

5. A stopper as defined in claim 4, wherein said cup-shaped annular component is form-fitted to said cylinder by an axially concentric bead and a matching axially concentric groove, said axially concentric bead being pinched up axially out of an outer edge of said base of the said cup-shaped annular component, said matching axially concentric groove being pinched up axially out of said piston-rod entry-and-exit end of said cylinder and receiving said bead.

6. A stopper as defined in claim 4 wherein said cup-shaped annular component is form-fitted to said wall of said cylinder by a flange and a bead, said flange being axially concentric and facing radially inward around said piston-rod entry-and-exit end of said cylinder, said bead being radially pinched in out of an inner surface of said cylinder below said rod-aligning component, said bead forcing said rod-aligning component toward the interior of said cylinder.

7. A stopper as defined in claim 1, wherein said rod-aligning component is of plastic material.

8. A stopper in a hydraulic dashpot for a motor vehicle, comprising: a piston and cylinder with an interior, said cylinder holding fluid and being divided into two chambers by said piston, a piston rod mounting said piston at one end and traveling into and out of said cylinder, said stopper being mounted at an end of said cylinder where said piston rod travels in and out; seals and a plurality of annular components in said stopper, at least one of said annular components being attached to a wall of said cylinder; said stopper having another one of said annular components in shape of a cup at an entry-and-exit end of said piston rod; said cup-shaped annular component having a base extending radially inward and having a circular hole at a center of said cup-shaped annular component, said piston rod extending through said hole, said cup-shaped annular component having a side extending toward said interior of said cylinder; an annular piston-rod aligning component in said cup-shaped annular component and being at least partly surrounded by said cup-shaped annular component; said annular rod-aligning component having an axially concentric circular cutout for said piston rod to travel in and out through and also including accommodations for said seals, said seals sealing said piston rod off from said rod-aligning component and being secured by said base of said cup-shaped annular component; one of said seals being between said annular piston-rod aligning component and the wall of said cylinder, said one of said seals being secured axially by a face of the wall of said cup-shaped annular component and by an annular shoulder on an outside surface of said aligning component, said seals being encapsulated and positioned in a preliminary stage of assembly, transverse forces acting on said piston rod being resisted, another one of said seals being between said stopper and said piston rod and being substantially close to said piston-rod aligning component; said aligning component being attached to the cup-shaped annular component by both force-fit and form-fit; said rod-aligning component being form-fitted to the cup-shaped annular component by a bead and groove; said cup-shaped annular component being force-fitted and form-fitted to a wall of said cylinder; said cup-shaped annular component being form-fitted to said cylinder by an axially concentric bead and a matching axially concentric groove, said axially concentric bead being pinched up axially out of an outer edge of said base of said cup-shaped annular component, said matching axially concentric groove being pinched up axially out of said piston-rod entry-and-exit end of said cylinder and receiving said bead; said rod-aligning component being of plastic material.

* * * * *